US011949960B2

(12) United States Patent
Shah et al.

(10) Patent No.: US 11,949,960 B2
(45) Date of Patent: *Apr. 2, 2024

(54) SELECTIVE PLAYBACK OF AUDIO AT NORMAL SPEED DURING TRICK PLAY OPERATIONS

(71) Applicant: Rovi Guides, Inc., San Jose, CA (US)

(72) Inventors: Akshay Chetan Shah, Maharashtra (IN); Padmassri Chandrashekar, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,157

(22) Filed: Dec. 14, 2022

(65) Prior Publication Data
US 2023/0188804 A1 Jun. 15, 2023

Related U.S. Application Data

(63) Continuation of application No. 17/166,454, filed on Feb. 3, 2021, now Pat. No. 11,558,674, which is a continuation of application No. 16/540,521, filed on Aug. 14, 2019, now Pat. No. 10,945,047.

(51) Int. Cl.
*H04N 21/6587* (2011.01)
*H04N 21/439* (2011.01)
*H04N 21/81* (2011.01)

(52) U.S. Cl.
CPC ..... *H04N 21/6587* (2013.01); *H04N 21/4394* (2013.01); *H04N 21/8106* (2013.01)

(58) Field of Classification Search
CPC .................. H04N 21/4394; H04N 21/6587
See application file for complete search history.

(56) References Cited

U.S. PATENT DOCUMENTS

| | | | |
|---|---|---|---|
| 7,136,571 B1* | 11/2006 | Dagtas | H04N 5/783 386/E5.052 |
| 10,866,719 B1* | 12/2020 | Bulusu | H04L 51/52 |
| 2010/0150520 A1 | 6/2010 | Hopwood et al. | |
| 2021/0051379 A1 | 2/2021 | Shah et al. | |
| 2021/0219027 A1 | 7/2021 | Shah et al. | |

* cited by examiner

*Primary Examiner* — Girumsew Wendmagegn
(74) *Attorney, Agent, or Firm* — Haley Guiliano LLP

(57) ABSTRACT

Systems and methods are described herein for selective playback of portions of audio at normal speed during a fast-forward operation. Upon receiving a command to perform a fast-forward operation, a current playback position is identified, as well as a plurality of portions of audio of the content item that will be subject to the fast-forward operation. A subset of the audio portions that will be subject to the fast-forward operation are selected. The fast-forward operation is initiated, and video of the content item is played back at the increased speed while the selected portions of audio of the content item are played back at normal speed.

20 Claims, 7 Drawing Sheets

|   | Timing | Importance |
|---|--------|------------|
| 1 | 2-5    | 5          |
| 2 | 6-8    | 1          |
| 3 | 10-14  | 4          |
| 4 | 15-18  | 2          |

|   | Timing | Importance | Character |
|---|--------|------------|-----------|
| 1 | 2-5    | 5          | Obi-Wan Kenobi |
| 2 | 6-8    | 1          | Stormtrooper |
| 3 | 10-15  | 2          | Obi-Wan Kenobi |
| 4 | 16-18  | 3          | Stormtrooper |

| Character | Preference |
|-----------|------------|
| Obi-Wan Kenobi | 3 |
| Luke Skywalker | 4 |
| Darth Vader | 4 |
| Princess Leia | 2 |

SELECTIVE PLAYBACK OF AUDIO AT NORMAL SPEED DURING TRICK PLAY OPERATIONS

CROSS-REFERENCE TO RELATED APPLICATION

This application is a continuation of U.S. patent application Ser. No. 17/166,454, filed Feb. 3, 2021, which is a continuation of U.S. patent application Ser. No. 16/540,521, filed Aug. 14, 2019, now U.S. Pat. No. 10,945,047, the disclosure of which are hereby incorporated by reference herein in their entireties.

BACKGROUND

The present disclosure relates to playback of media content and, more particularly, playback of audio portions of a content item during a trick play operation.

SUMMARY

Many times, during playback of a content item, a user may wish to skip ahead past portions of the content item or go back to review an earlier portion of the content item. For example, a user may find a particular portion of the content item uninteresting or inappropriate for younger viewers with whom the user is watching the content item. As another example, a user may wish to return to a previous portion of the content item to review details that the user missed when first viewing the content item. While many solutions exist for performing such skipping, including fast-forward and rewind operations, such solutions generally result in distorted audio being played back due to the increased speed at which the content item is being played back, or no audio output at all during the fast-forward or rewind operation. This prevents the user from hearing portions of the audio, such as dialogue, that may be important in the context of the content item.

Systems and methods are described herein for selective playback of portions of audio at normal speed during a trick play operation. Upon receiving a command to perform a trick play operation, a current playback position is identified. A plurality of portions of audio of the content item that will be subject to the trick play operation are also identified. For example, the command may include an indication of the increased speed at which the trick play operation is to be performed, and from which a minimum duration of the trick play operation can be calculated. Audio portions within the minimum duration of the current playback position may therefore be subject to the trick play operation. A subset of the audio portions that will be subject to the trick play operation are selected. The trick play operation is initiated, and video of the content item is played back at the increased speed in the direction indicated by the command (i.e., forward for a fast-forward command and reverse for a rewind command), while the selected portions of audio of the content item are played back at normal speed.

To select the subset of portions of audio, metadata of the content item is accessed, which contains an importance level or significance factor for each portion of audio of the content item. If the importance level of a particular portion of audio exceeds a threshold importance level, then that portion is selected as a member of the subset of portions of audio. User preferences may also be taken into account when selecting portions of audio. The metadata of the content item may contain additional descriptors for each portion of audio aside from an importance level, such as an identifier of the character or actor featured in each respective portion of audio. The descriptors are compared with the user preferences, and a preference factor for each portion is calculated. The importance level for each portion of audio is then determined based on the significance factor contained in the metadata and the preference factor calculated based on the user preferences. For example, the preference factor may be applied as a weighting factor to the importance level contained in the metadata. Additionally, the duration of each portion of audio of the content may be considered. Portions of audio that have a short duration may be better suited for playback than portions of audio that have a longer duration. If a portion of audio has a high importance level and a long duration, the portion of audio may be selected as part of the subset of portions of audio and played back slightly faster than the normal playback speed (e.g., 1.05× speed).

In order to play back the subset of portions of audio separately from the video of the content item, the audio portions may be buffered. As the trick play operation advances or reverses the content item at an increased speed, the subset of audio portions are played back from the buffer. Alternatively, the audio may be separated from the video of the content item such that the trick play operation affects only the video of the content item. As the trick play operation advances or reverses the video, the audio is advanced or reversed to a playback position of the first portion of audio of the subset of portions of audio, and the first portion of audio is played back at normal speed. The audio is then advanced or reversed to a playback position corresponding to the next portion of audio or the subset of portions of audio.

A moving window may be initialized at the start of the trick play operation. The window may have a starting position corresponding to the current playback position and a length corresponding to the minimum duration of the fast-forward operation. If the trick-play operation is a rewind operation, the length of the window may extend backward from the starting position to an earlier playback position. During the trick play operation, the starting position of the moving window is advanced or reversed at a speed corresponding to the increased speed at which the trick play operation is being performed. Portions of audio having starting times that fall within the window are identified as portions which will be subject to the trick play operation and thus analyzed to determine which will be selected as a member of the subset of portions of audio.

While the descriptions below relate to a fast-forward operation, a person skilled in the art will appreciate that, as discussed to above, the systems and methods described herein can be applied to both fast-forward and rewind operations. The descriptions below should not be considered to restrict the subject matter of this disclosure to fast-forward operations.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
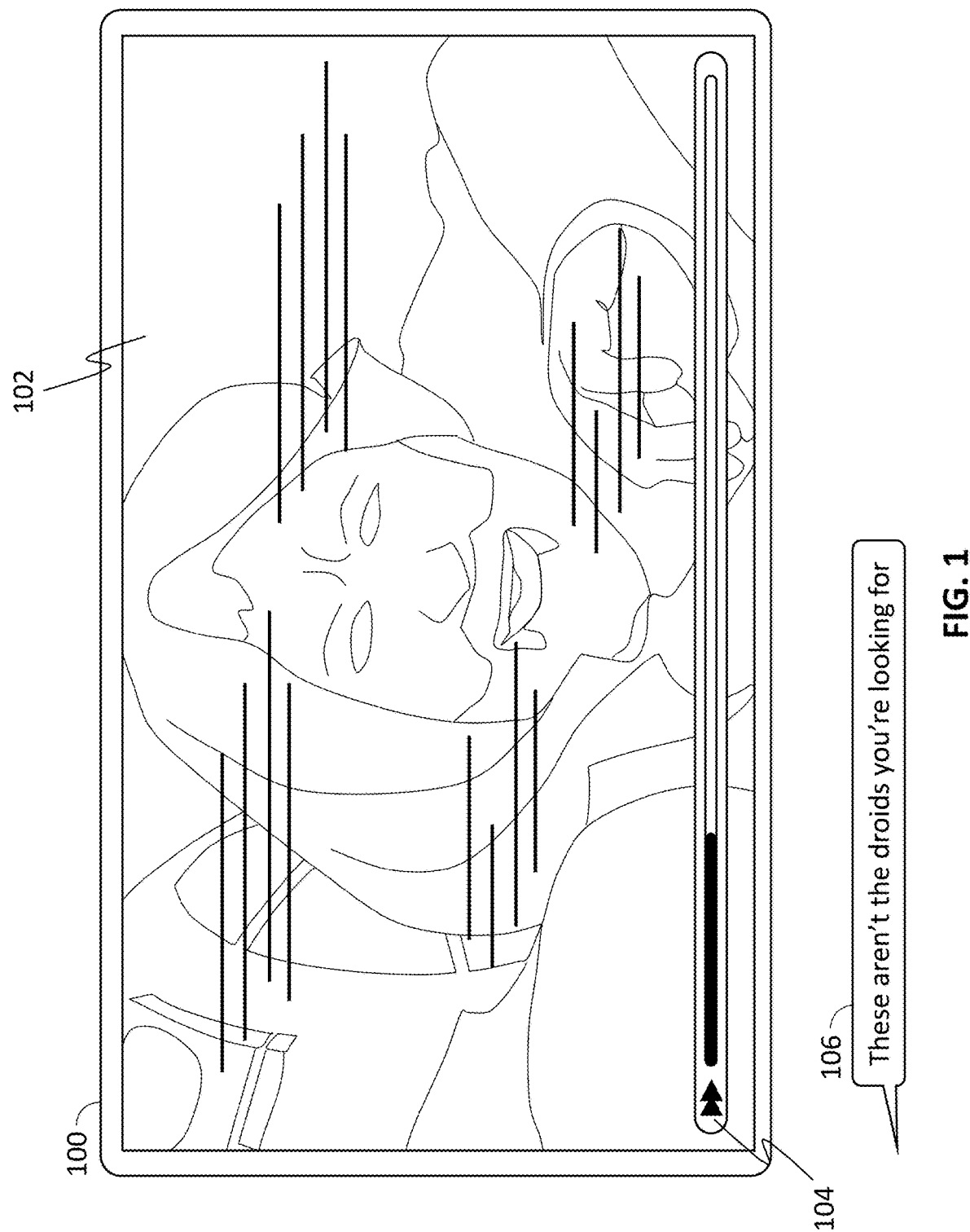
FIG. 1 shows an example of playback of a portion of audio of a content item during a fast-forward operation, in accordance with some embodiments of the disclosure.

FIG. 1 shows an example of playback of a portion of audio of a content item during a fast-forward operation, in accordance with some embodiments of the disclosure. A user uses media device 100 to play back content item 102. For example, the user is watching the movie "Star Wars" on media device 100. Media device 100 includes both a video output device (e.g., an integrated screen or a port through which video data can be sent to an external display) and an audio output device (e.g., one or more integrated speakers or a port through which audio data can be sent to an external speaker or headphones). Video and audio of "Star Wars" are thus output by media device 100. Media device 100 also receives commands from a user input device or user interface (e.g., touchscreen user interface). Media device 100 receives a fast-forward command from the user. When performing the requested fast-forward operations, a visual playback status indicator 104 may indicate that a fast-forward operation is currently being executed. During the fast-forward operation, media device 100 identifies portions of audio that will be subject to the fast-forward operation and plays back some portions of audio at normal speed, such as portion 106. Media device 100 selects which portions of audio to play back at normal speed based on significance or importance of each portion. For example, media device 100 accesses metadata of content item 102, which describes the portions of audio and their respective importance to content item 102. For example, in the scene of "Star Wars" in which Luke Skywalker and Obi-Wan Kenobi travel to the spaceport, they are stopped at a checkpoint by stormtroopers looking for R2-D2 and C-3PO. Obi-Wan Kenobi, using the Force, tells the stormtroopers "These aren't the droids you're looking for," which results in the stormtroopers allowing them to continue on their way. Metadata describing the portions of audio (i.e., dialogue) in this scene may identify "These aren't the droids you're looking for" as important because of its significance to the plot of the movie. Media device 100 therefore plays back that portion (i.e., portion 106) at normal speed while continuing to play back the video at the increased speed of the fast-forward operation. Additionally, metadata of the content item 102 may describe the duration of each portion of audio. Media device 100 may consider the duration of each respective portion of audio in addition to their respective importance. Portion of audio having long durations (e.g., five seconds or longer) may not generally be suitable for playback during the fast-forward operation because it may occupy the entire duration of the fast-forward operation. If, however, a portion of audio is of high importance, media device 100 may select that portion of audio and play the portion of audio back at a playback speed that is faster than the normal playback speed and slower than the increased speed of the fast-forward operation. For example, a very important portion of audio may have a duration of six seconds. Media device 100 may select the portion of audio and play it back at 1.05× speed while the fast-forward operation plays back the video of the content item at 2× speed.

Media device 100 may buffer audio data of the portions of audio such as portion 106 as the fast-forward operation proceeds, playing back the portion at normal speed from the buffered audio data. Alternatively, media device 100 may separate and individually control playback of the video and audio of content item 102, generating separate video and audio streams. Media device 100 increases the playback speed of the video stream and advances the playback position of the audio stream to a position corresponding to portion 106, which is played back at normal speed. Upon conclusion of portion 106, media device 100 advances the playback position of the audio stream to the next identified portion of audio to be played back.

To identify portions of audio that will be subject to the fast-forward operation, media device 100 may initialize a moving window having a starting point at the current playback point and a length corresponding to the minimum duration of the fast-forward operation. The minimum duration can be determined based on the increased playback speed to be used in the fast-forward operation and the average amount of time a user is expected to want to execute the fast-forward command. For example, if the fast-forward operation increases the playback speed to 2× speed and the user is expected to fast-forward for ten seconds, media device 100 may initialize the moving window with a length of twenty seconds.

Figures 2, 3, 4:
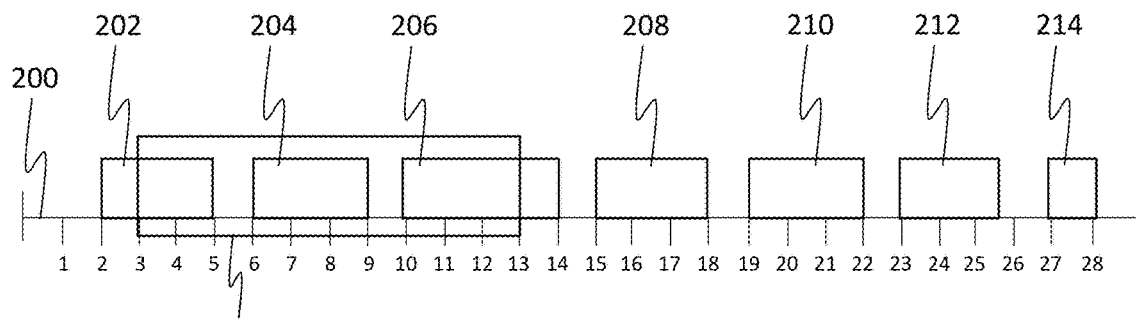
FIG. 2 shows a timeline of portions of audio of a content item and a moving window encompassing portions that will be subject to a fast-forward operation, in accordance with some embodiments of the disclosure.
FIG. 3 shows an example of metadata describing portions of audio of a content item, in accordance with some embodiments of the disclosure.
FIG. 4 shows another example of metadata describing portions of audio of a content item and user preference data, in accordance with some embodiments of the disclosure.

FIG. 2 shows a timeline 200 of portions of audio 202, 204, 206, 208, 210, 212, 214 of a content item and a moving window 216 encompassing portions that will be subject to a fast-forward operation, in accordance with some embodiments of the disclosure. Media device 100 receives a fast-forward command at playback position 3 as shown on timeline 200. Media device 100 initializes moving window 216 beginning at position 3. The fast-forward command indicates an increase in playback speed to 2× speed. Media device 100 multiplies an average fast-forward length of five seconds by this increased speed and sets the length of moving window 216 to ten seconds. Thus, at least part of each of audio portions 202, 204, and 206 falls within the moving window. Media device 100 determines whether the importance of any of audio portions 202, 204, or 206 exceeds a threshold level of importance and, if so, selects that portion for playback at normal speed. As the fast-forward operation continues, moving window 216 is advanced at a speed corresponding to the increased playback speed of the fast-forward operation, and the importance of additional portions of audio is determined as such portions (e.g., audio portions 208, 210, 212) fall within moving window 216. The length of moving window 216 may be adjusted to account for a reaction time between receipt of a command to resume playback at normal speed and the actual resumption of playback at normal speed. As noted above, duration of a portion of audio may be considered in selecting a portion for playback. If a portion of audio having a long duration is selected for playback, it may be played back a speed that is faster than normal playback speed, such as 1.05× speed.

FIG. 3 shows an example of metadata 300 describing portions of audio of a content item, in accordance with some embodiments of the disclosure. Metadata 300 includes timing information 302 describing the start and end time of each portion of audio, and importance information 304 with an importance level of each portion of audio. For example, metadata 306 describes portion of audio 202, which begins at position 2, ends at position 5, and has an importance level of 5. Metadata 308, 310, and 312 similarly describe portions of audio 204, 206, and 208. In some embodiments, the metadata may include additional information about each portion of audio. FIG. 4 shows one such example of metadata 400 describing portions of audio of a content item as well as user preference data 402, in accordance with some embodiments of the disclosure. Metadata 400 includes character information 404 identifying a character featured in each portion of audio. User preference data 402 includes data for each character 406 and corresponding user preference factors 408. Media device 100 may use the character information 404 in conjunction with user preference data 402, indicating a user preference level for particular characters, to determine an importance level for each portion of audio.

Figure 5:
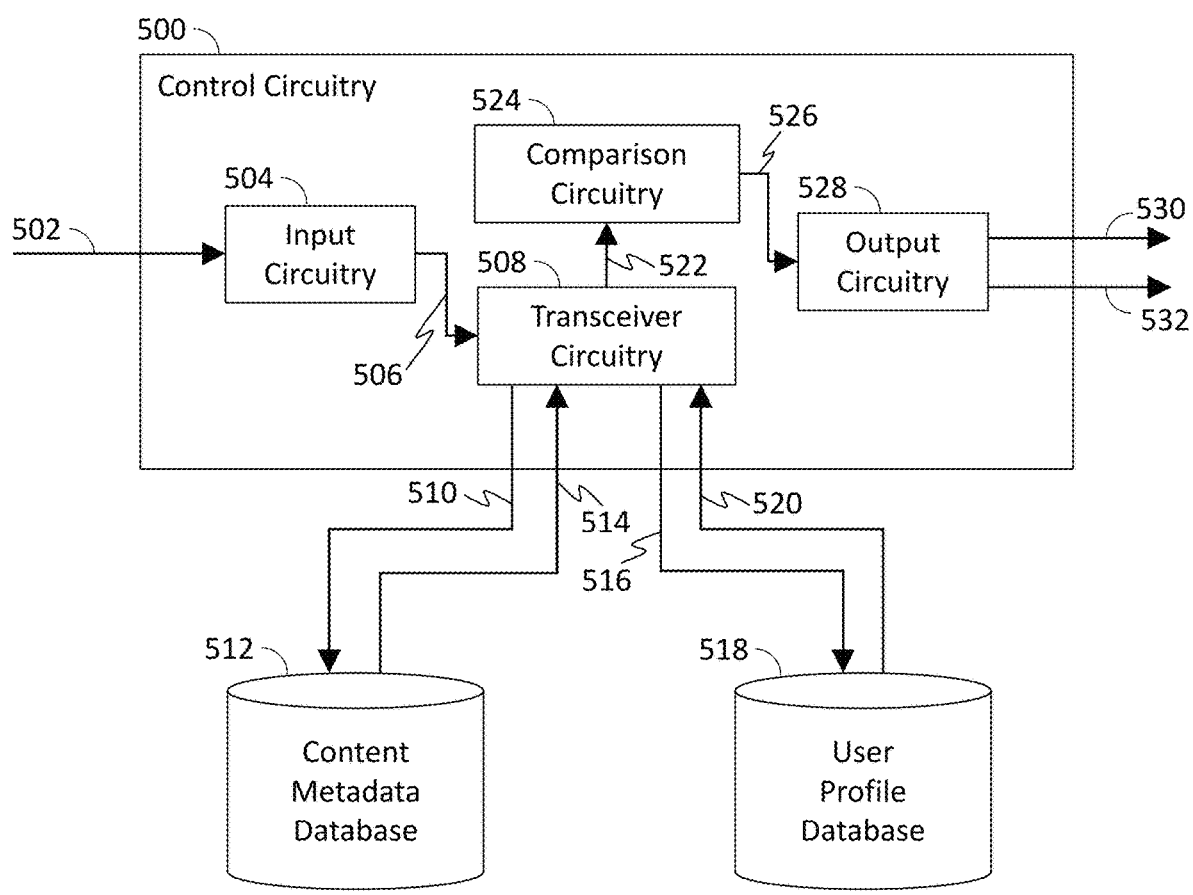
FIG. 5 is a block diagram showing components and data flow therebetween of an exemplary system for selectively playing back portions of audio of a content item, in accordance with some embodiments of the disclosure.

FIG. 5 is a block diagram showing components and data flow therebetween of an exemplary system for selectively playing back portions of audio of a content item, in accordance with some embodiments of the disclosure. Control circuitry 500 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 500 receives 502, using input circuitry 504, a command to perform a fast-forward operation. Input circuitry 504 may include a microphone and voice processing circuitry for receiving voice commands, infrared receiving circuitry for receiving commands from a remote control device, a touchscreen interface for receiving user interactions with graphical user interface elements, or any combination thereof or any other suitable input circuitry for receiving any other suitable user input. In response to the command, input circuitry 504 generates a query for metadata of the content item (e.g., metadata 300 or metadata 400) and transmits 506 the query to transceiver circuitry 508 to be transmitted 510 to content metadata database 512. The query may be an SQL "SELECT" command, or any other suitable query format. Transceiver circuitry 508 may be a network connection such as an Ethernet port, WiFi module, or any other data connection suitable for communicating with a remote server. Transceiver circuitry 508 receives 514 from content metadata database 512, in response to the query, metadata describing a plurality of portions of audio of the content item (e.g., metadata 300 or metadata 400). In some embodiments input circuitry 504 also generates a second query for user preference data. Transceiver circuitry 508 transmits 516 the second query to user profile database 518 and receives 520 from user profile database 518, in response to the query, user preference data (e.g., user preference data 402).

Transceiver circuitry 508 transfers 522 the metadata to comparison circuitry 524. Comparison circuitry 524 identifies a number of portions of audio that will be subject to the fast-forward operation and analyzes their respective importance levels to select a subset of portions of audio that are to be played back at normal speed during the fast-forward operation. Comparison circuitry 524 may also receive, or have access to, the current playback position and the length of moving window 216. Once the subset of portions of audio have been selected, comparison circuitry 524 transfers 526 the identifiers corresponding to the subset of portions to output circuitry 528. Output circuitry 528 increases the speed of video output 530 and, using the identifiers of the subset of portions of audio, outputs 532 audio of each portion of the subset of portions. Output circuitry 528 may time the output of each portion of audio to correspond with the time at which the corresponding video is played back at the increased speed, or may simply play each portion sequentially.

Figure 6:
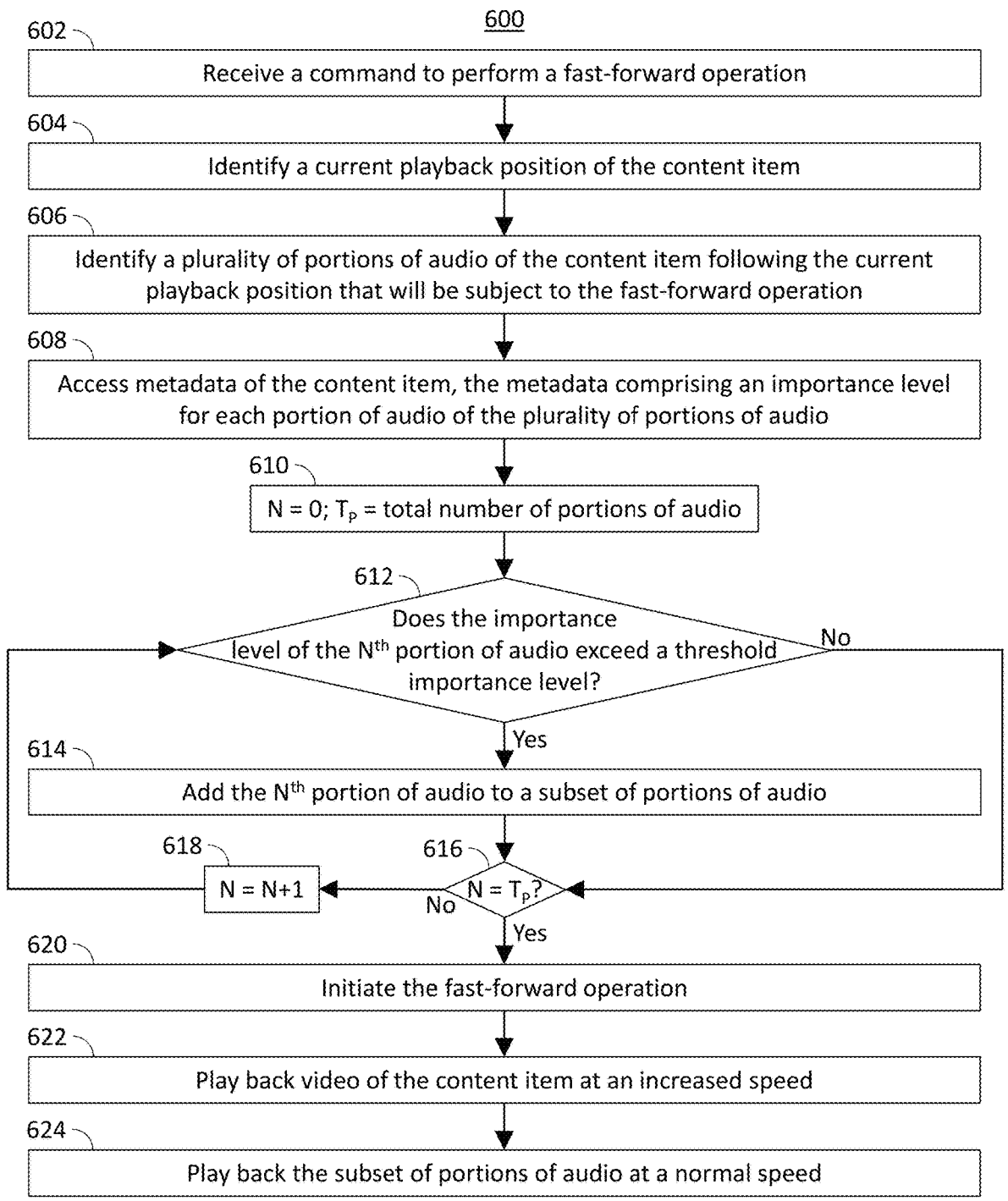
FIG. 6 is a flowchart representing an illustrative process for selectively playing back portions of audio of a content item, in accordance with some embodiments of the disclosure.

FIG. 6 is a flowchart representing an illustrative process 600 for selectively playing back portions of audio of a content item, in accordance with some embodiments of the disclosure. Process 600 may be implemented on control circuitry 500. In addition, one or more actions of process 600 may be incorporated into or combined with one or more actions of any other process or embodiment described herein.

At 602, control circuitry 500 receives, using input circuitry 504, a command to perform a fast-forward operation. The command may be received from a remote control or other user input device, or may be a voice command. At 604, control circuitry 500 identifies a current playback position of the content item. For example, control circuitry 500 accesses a timestamp of a frame of video content currently being displayed.

At 606, control circuitry 500 identifies a plurality of portions of audio of the content item following the current playback position that will be subject to the fast-forward operation. For example, control circuitry 500 accesses, using transceiver circuitry 508, metadata of the content item describing portions of audio of the content item and their respective starting times. Control circuitry 500 determines, based on the starting time of each portion of audio and the current playback position, which portions of the plurality of portions of audio will be subject to the fast-forward operation. At 608, control circuitry 500 accesses metadata of the content item comprising an importance level of each portion of audio that will be subject to the fast-forward operation.

At 610, control circuitry 500 initializes a counter variable N, setting its value to zero, and a variable $T_P$ representing the total number of portions of audio subject to the fast-forward operation, setting its value to the number of portions of audio. At 612, control circuitry 500 determines whether the importance level of the $N^{th}$ portion of audio exceeds a threshold importance level. For example, portions of audio may be rated on a scale of importance from one to five. Control circuitry 500 may establish a threshold importance level of four, meaning that any portion having an importance level of four or higher should be played back at normal speed. If the importance level of the $N^{th}$ portion of audio exceeds the threshold importance level, then, at 614, control circuitry 500 adds the $N^{th}$ portion of audio, or an identifier thereof, to a subset of portions of audio.

After adding the $N^{th}$ portion of audio to the subset of portions of audio, or if the importance level of the $N^{th}$ portion of audio does not exceed the threshold importance level, at 616, control circuitry 500 determines whether N is equal to $T_P$. If not, then, at 618, control circuitry 500 increments the value of N by one, and processing returns to step 612. If N equals $T_P$, meaning that all portions of audio have been analyzed, then, at 620, control circuitry 500 initiates the fast-forward operation.

At 622, control circuitry 500, using output circuitry 528, plays back video of the content item at an increased speed. At 624, control circuitry 500, using output circuitry 528, plays back the subset of portions of audio at normal speed. Control circuitry 500 may determine when video corresponding to each portion of the subset of portions of audio is displayed and play back the corresponding portion of audio at that time. Alternatively, control circuitry 500 may play each portion of the subset of portions sequentially beginning at the time at which the fast-forward operation is initiated.

In cases where the time required to play back the subset of potions of audio at normal speed exceed the duration of the fast-forward operation, control circuitry 500 may slow the speed at which the fast-forward operation is performed. For example, control circuitry 500 may reduce the speed from 2× to 1.5× in order to provide additional time to play back the subset of portions of audio at normal speed before the end of the fast-forward operation. Alternatively or additionally, control circuitry 500 may reduce the number of portions in the subset of portions of audio. For example, control circuitry 500 may raise the threshold level of importance or may disregard user preference data which resulted in the inclusion of additional portions of audio.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
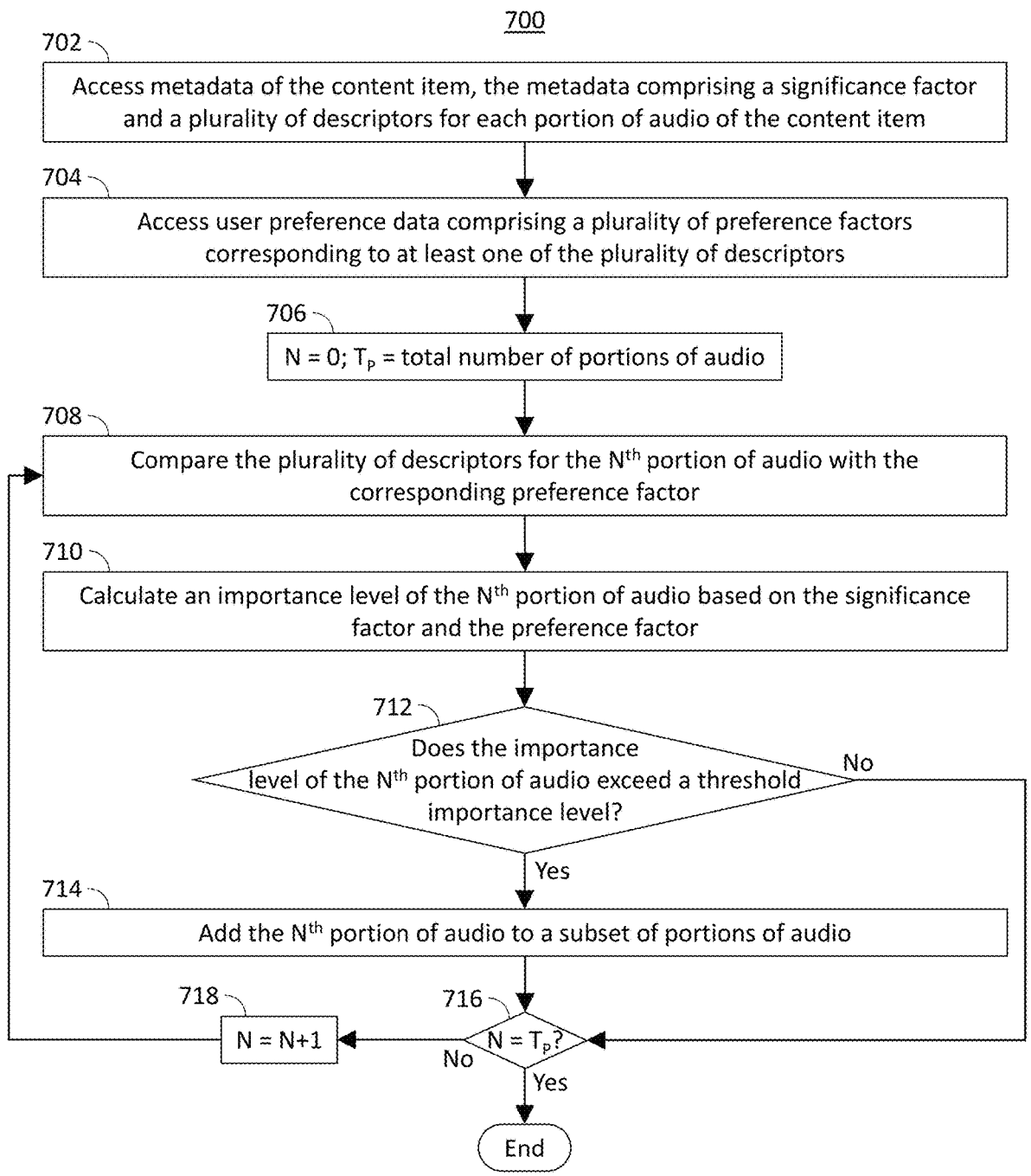
FIG. 7 is a flowchart representing an illustrative process for identifying and selecting portions of audio of a content item to be played back during a fast-forward operation, in accordance with some embodiments of the disclosure.

FIG. 7 is a flowchart representing an illustrative process 700 for identifying and selecting portions of audio of a content item to be played back during a fast-forward operation, in accordance with some embodiments of the disclosure. Process 700 may be implemented on control circuitry 500. In addition, one or more actions of process 700 may be incorporated into or combined with one or more actions of any other process or embodiment described herein.

At 702, control circuitry 500 accesses metadata of the content item comprising a significance factor and a plurality of descriptors for each portion of audio of the content item. For example, control circuitry 500, using transceiver circuitry 508, transmits a query to a database and receives the metadata in response to the query. The significance factor may represent a significance of the portion of audio to the overall plot of the content item. At 704, control circuitry 500 accesses user preference data comprising a plurality of preference factors corresponding to at least one of the plurality of descriptors. For example, control circuitry 500, using transceiver circuitry 508, transmits a query to a user profile database and receives the user preference data in response to the query. The plurality of descriptors may include an identifier of the character who spoke each portion of audio, and the user preference data may include preference factors for a plurality of characters.

At 706, control circuitry 500 initializes a counter variable N, setting its value to zero, and a variable $T_P$ representing the total number of portions of audio, setting its value to the number of portions of audio. At 708, control circuitry 500, using comparison circuitry 524, compares the plurality of descriptors for the $N^{th}$ portion of audio with the corresponding preference factor. For example, a character descriptor of the portion of audio corresponding to the dialogue "These aren't the droids you're looking for" may indicate Obi-Wan Kenobi as the speaker of the dialogue. User preference data may indicate a high preference factor for the character Obi-Wan Kenobi. At 710, control circuitry 500 calculates an importance level of the $N^{th}$ portion of audio based on the significance factor and the preference factor. This may be accomplished using methods described below in connection with FIG. 8.

At 712, control circuitry 500 determines whether the importance level of the $N^{th}$ portion of audio exceeds a threshold importance level. This may be accomplished using methods described above in connection with FIG. 6. If so, then, at 714, control circuitry 500 adds the $N^{th}$ portion of audio to a subset of portions of audio. After doing so, or if the importance level of the $N^{th}$ portion of audio does not exceed the threshold importance level, at 716, control circuitry 500 determines whether N is equal to $T_P$. If not, then, at 718, control circuitry 500 increments the value of N by one, and processing returns to step 708. It N is equal to $T_P$, meaning that all portions of audio have been analyzed, then the process is complete.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
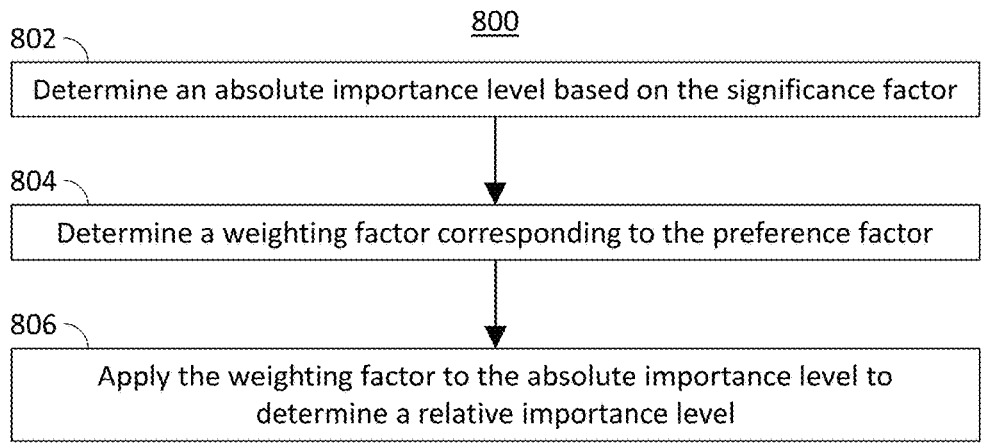
FIG. 8 is a flowchart representing an illustrative process for determining an importance level of a portion of audio of a content item, in accordance with some embodiments of the disclosure.

FIG. 8 is a flowchart representing an illustrative process 800 for determining an importance level of a portion of audio of a content item, in accordance with some embodiments of the disclosure. Process 800 may be implemented on control circuitry 500. In addition, one or more actions of process 800 may be incorporated into or combined with one or more actions of any other process or embodiment described herein.

At 802, control circuitry 500 determines an absolute importance level based on the significance factor. For example, the significance factor may indicate the significance of the portion of audio within the context of the entire content item, in which case the significance factor is equal to the absolute importance level. Alternatively, the significance factor may indicate the significance of the portion of audio only in relation to other portions of audio in the same scene or subset of portions of audio. In this case, the overall importance of the scene or subset of portions of audio influences the absolute importance of the portion of audio.

At 804, control circuitry 500 determines a weighting factor corresponding to the preference factor. For example, control circuitry 500 may convert an integer preference factor into a percent value by which the absolute importance level is to be multiplied. The preference factor may be an integer from one to five. If the preference factor is three or lower, indicating low preference, control circuitry 500 converts the preference factor into a percentage value that is less than one. If the preference factor is higher than three, indicating higher preference, control circuitry 500 converts the preference factor into a percentage value that is higher than one. At 806, control circuitry 500 applies the weighting factor to the absolute importance level by, for example, multiplying the importance level by the percentage value, to determine a relative importance level of the portion of audio.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
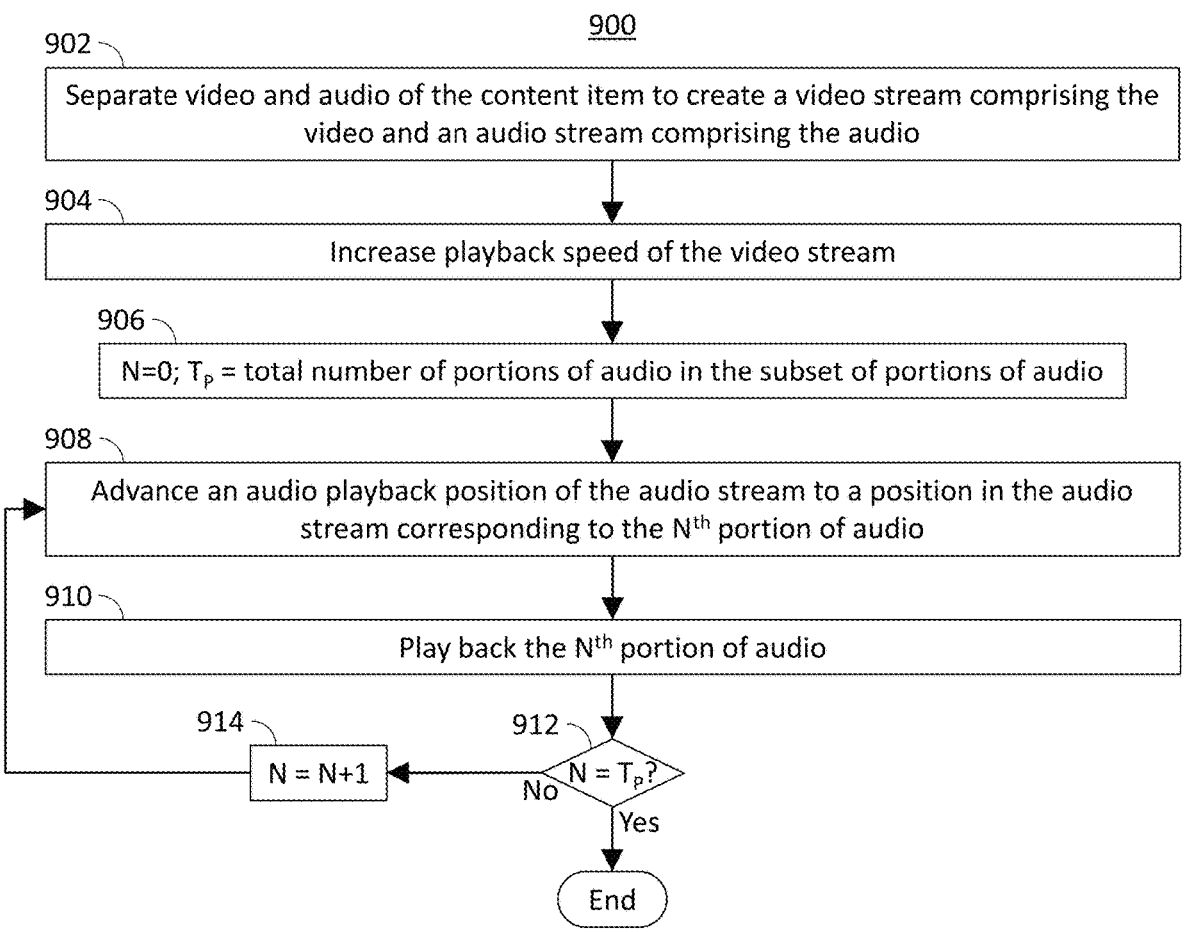
FIG. 9 is a flowchart representing an illustrative process for playing back portions of audio of a content item separately from video of the content item, in accordance with some embodiments of the disclosure.

FIG. 9 is a flowchart representing an illustrative process 900 for playing back portions of audio of a content item separately from video of the content item, in accordance with some embodiments of the disclosure. Process 900 may be implemented on control circuitry 500. In addition, one or more actions of process 900 may be incorporated into or combined with one or more actions of any other process or embodiment described herein.

At 902, control circuitry 500 separates video and audio data of the content item to create a video stream comprising the video and an audio stream comprising the audio. For example, control circuitry 500 may apply a filter to the content item which isolates packets containing video data from packets containing audio data. Alternatively, the content item may be in a format such as MPEG-2, which inherently contains separate audio and video streams which control circuitry 500 can process separately.

At 904, control circuitry 500 increases playback speed of the video stream. Control circuitry 500, having separated the video and audio into individual streams, can control the playback of each stream individually.

At 906, control circuitry 500 initializes a counter variable N, setting its value to zero, and a variable $T_P$ representing the total number of portions of audio in the subset of portions of audio, setting its value to the number of portions of audio in the subset of portions of audio. At 908, control circuitry 500 advances an audio playback position of the audio stream to a position in the audio stream corresponding to the $N^{th}$ portion of audio. For example, metadata of the $N^{th}$ portion of audio indicates a start time. Control circuitry 500 advances the playback position of the audio stream to the indicated start time. At 910, control circuitry 500 plays back the $N^{th}$ portion of audio at normal speed. At 912, control circuitry 500 determines whether N is equal to $T_P$. If not, then, at 914, control circuitry 500 increments the value of N by one, and processing returns to step 908. If N is equal to $T_P$, meaning that all portions of audio of the subset of portions of audio have been played back, then the process is complete.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
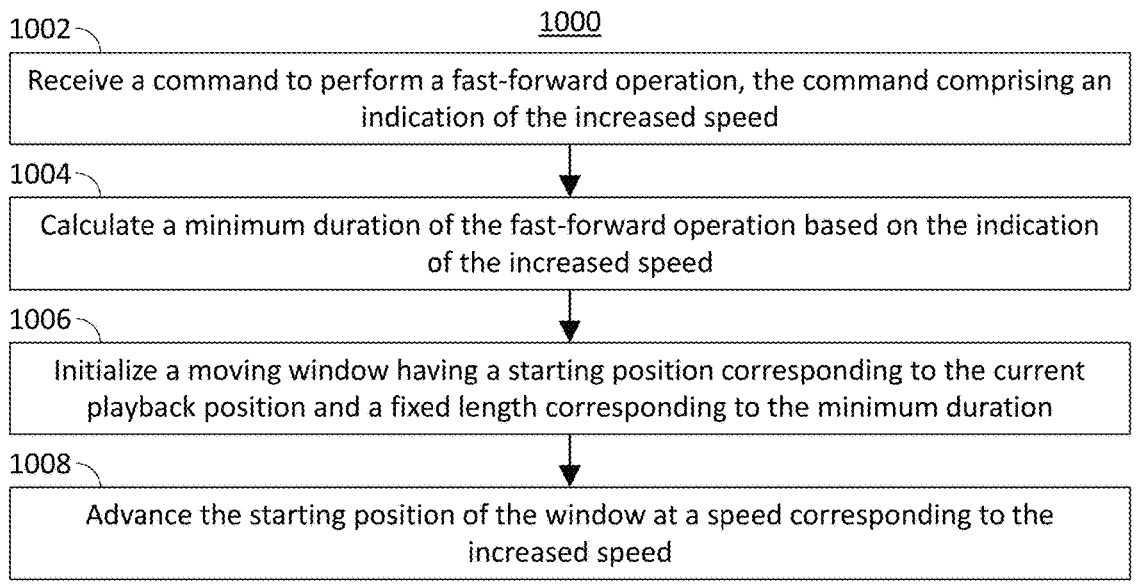
FIG. 10 is a flowchart representing an illustrative process for advancing a moving window along a content item, in accordance with some embodiments of the disclosure.

FIG. 10 is a flowchart representing an illustrative process 1000 for advancing a moving window along a content item, in accordance with some embodiments of the disclosure. Process 1000 may be implemented on control circuitry 500. In addition, one or more actions of process 1000 may be incorporated into or combined with one or more actions of any other process or embodiment described herein.

At 1002, control circuitry 500 receives a command to perform a fast-forward operation, the command comprising an indication of the increased speed. For example, the command may indicate that the fast-forward operation should advance through the content item at 1.5×, 2×, 3×, or 4× speed. At 1004, control circuitry 500 calculates a minimum duration of the fast-forward operation based on the indication of the increased speed. For example, if 2× speed is indicated, control circuitry 500 determines that, for every second that the fast-forward operating is being performed, two seconds of content are being played back. In some embodiments, control circuitry may use the average length of a fast-forward operation or the length of the current scene to determine for how long the fast-forward operating will be performed and multiply that time by the increased speed to calculate the duration of the fast-forward operation in terms of content length.

At 1006, control circuitry 500 initializes a moving window having a starting position corresponding to the current playback position and a fixed length corresponding to the minimum duration. At 1008, control circuitry 500 advances the starting position of the window at a speed corresponding to the increased speed to identify additional portions of audio that will be subject to the fast-forward operation. For example, if the fast-forward operation is performed at 2× speed, the starting point of the moving window is advance by 2 seconds of content every second.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
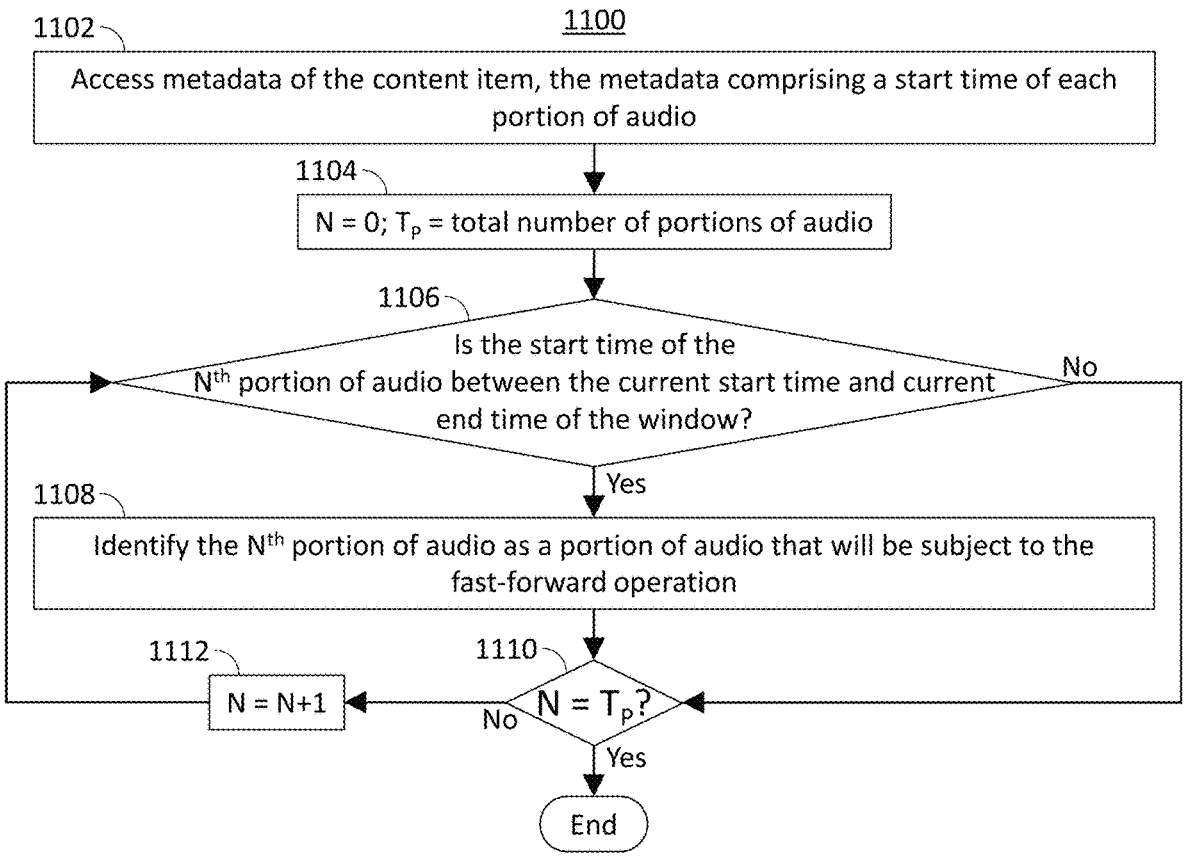
FIG. 11 is a flowchart representing an illustrative process for identifying portions of audio of a content item that will be subject to a fast-forward operation, in accordance with some embodiments of the disclosure.

FIG. 11 is a flowchart representing an illustrative process 1100 for identifying portions of audio of a content item that will be subject to a fast-forward operation, in accordance with some embodiments of the disclosure. Process 1100 may be implemented on control circuitry 500. In addition, one or more actions of process 1100 may be incorporated into or combined with one or more actions of any other process or embodiment described herein.

At 1102, control circuitry 500 accesses metadata of the content item, the metadata comprising a start time of each portion of audio. At 1104, control circuitry 500 initializes a counter variable N, setting its value to zero, and a variable $T_P$ representing the total number of portions of audio, setting its value to the total number or portions of audio. At 1106, control circuitry 500 determines whether the start time of the $N^{th}$ portion of audio is between the current start time and current end time of the moving window. If so, then, at 1108, control circuitry 500 identifies the $N^{th}$ portion of audio as a portion of audio that will be subject to the fast-forward operation. After making the identification, or if the start time of the $N^{th}$ portion of audio is not between the current start time and current end time of the moving window, at 1110, control circuitry determines whether N is equal to $T_P$. If no, then, at 1112, control circuitry 500 increments the value of N by one, and processing returns to step 1106. If N is equal to $T_P$, meaning that all portions of audio have been analyzed, then the process is complete.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a command to fast-forward a content item that includes a plurality of audio segments at a first speed, wherein the first speed is faster than a normal speed at which the content item is played without a fast-forward command;
determining an importance level for each audio segment of the plurality of audio segments;
determining that the importance level of a first audio segment, from the plurality of audio segments, has an importance level that exceeds a threshold importance level; and
in response to the determination, playing the first audio the segment at a second speed, wherein the second speed is slower than the first speed.

2. The method of claim 1, wherein the importance level for each audio segment is determined based on a calculation of a significance and a preference factor associated with each audio segment.

3. The method of claim 2, wherein the significance factor represents significance of the audio segment to an overall plot of the content item.

4. The method of claim 2, further comprising, determining the preference factor for each audio segment, wherein the determination comprises:
accessing a) metadata for each audio segment of the content item and b) user preferences; and
comparing the metadata with the user preferences to determine the preference factor for each audio segment.

5. The method of claim 4, wherein the comparing metadata with user preferences includes comparing a plurality of descriptors, included in the metadata, for each audio segment with the user preferences.

6. The method of claim 1, wherein the second speed is a normal speed, and the first speed is a desired fast-forward speed received via the command.

7. The method of claim 1, wherein the second speed is a fast-forward speed that is faster than a normal speed but slower than the first speed.

8. The method of claim 1, further comprising, accessing descriptive information about each audio segment, from the plurality of audio segments; and factoring the descriptive information to determine the importance level of the audio segment.

9. The method of claim 1, wherein determining the importance level for each audio segment of the plurality of audio segments is performed for the plurality of audio segments that fall within a time window of the media content.

10. The method of claim 9, wherein the time window starts at the point when the command is received and has a duration that matches a predetermined calculated length of the time window.

11. The method of claim 1, further comprising a moving window corresponding to the second speed, wherein the moving window is advanced at a speed corresponding to the second speed.

12. A system comprising;
input/output circuitry configured to:
receive a command to fast-forward a content item that includes a plurality of audio segments at a first speed wherein the first speed is faster than a normal speed at which the content item is played without a fast-forward command;
processing circuitry configured to:
determine an importance level for each audio segment of the plurality of audio segments;
determine that the importance level of a first audio segment, from the plurality of audio segments, has an importance level that exceeds a threshold importance level; and
in response to the determination, play the first audio segment at a second speed, wherein the second speed is slower than the first speed.

13. The system of claim 12, wherein the importance level for each audio segment is determined by the processing circuitry based on a calculation of a significance and a preference factor associated with each audio segment.

14. The system of claim 13, wherein the significance factor represents significance of the audio segment to an overall plot of the content item.

15. The system of claim 13, further comprising, the processing circuitry configured to determine the preference factor for each audio segment, wherein the determination comprises, the processing circuitry further configured to:
access a) metadata for each audio segment of the content item and b) user preferences; and
compare the metadata with the user preferences to determine the preference factor for each audio segment.

16. The system of claim 15, wherein the comparing metadata with user preferences includes the processing circuitry configured to compare a plurality of descriptors, included in the metadata, for each audio segment with the user preferences.

17. The system of claim 12, wherein the second speed is a normal speed, and the first speed is a desired fast-forward speed received via the command.

18. The system of claim 12, wherein the second speed is a fast-forward speed that is faster than a normal speed but slower than the first speed.

19. The system of claim 12, wherein determining the importance level for each audio segment of the plurality of audio segments is performed by the processing circuitry for the plurality of audio segments that fall within a time window of the media content.

20. The system of claim 19, wherein the time window starts at the point when the command is received and has a duration that matches a predetermined calculated length of the time window.

* * * * *